(12) United States Patent
Baillie

(10) Patent No.: US 9,400,504 B2
(45) Date of Patent: Jul. 26, 2016

(54) MOBILE ROBOT

(75) Inventor: Jean-Christophe Baillie, Paris (FR)

(73) Assignee: Aldebaran Robotics, Paris (FR)

(*) Notice: Subject to any disclaimer, the term of this patent is extended or adjusted under 35 U.S.C. 154(b) by 277 days.

(21) Appl. No.: 13/819,156

(22) PCT Filed: Sep. 5, 2011

(86) PCT No.: PCT/EP2011/065322
§ 371 (c)(1),
(2), (4) Date: Feb. 26, 2013

(87) PCT Pub. No.: WO2012/028744
PCT Pub. Date: Mar. 8, 2012

(65) Prior Publication Data
US 2013/0158748 A1    Jun. 20, 2013

Related U.S. Application Data

(60) Provisional application No. 61/379,777, filed on Sep. 3, 2010.

(51) Int. Cl.
*G05D 1/02* (2006.01)
*G05D 1/00* (2006.01)

(52) U.S. Cl.
CPC ............ *G05D 1/0276* (2013.01); *G05D 1/0038* (2013.01); *G05D 1/0225* (2013.01);
(Continued)

(58) Field of Classification Search
CPC ... G05D 1/0225; G05D 1/0274; G05D 1/021; G05D 1/0234; G05D 1/0242; G05D 1/0246; G05D 1/0255; G05D 1/027; G05D 1/0272; G05D 2201/0207; G05D 1/0038; B25J 11/008; B25J 19/0091; B25J 19/06; B25J 5/007; B25J 9/0003; B25J 9/1697; B25J 19/023; G06F 19/3406; G06F 19/3418; G06F 19/3462; G06N 3/008; Y10S 901/01; Y10S 901/46; Y10S 901/47; G11B 2220/2562; G11B 27/105
USPC ............... 701/2; 700/245, 255, 264; 711/111; 715/765; 318/568.12, 568.16; 345/474; 386/247; 180/24.05
See application file for complete search history.

(56) References Cited

U.S. PATENT DOCUMENTS

| | | | | |
|---|---|---|---|---|
| 8,095,239 B2* | 1/2012 | Root | ................... | G05D 1/0038 180/24.05 |
| 2002/0081937 A1* | 6/2002 | Yamada | ................... | A63H 3/48 446/175 |

(Continued)

FOREIGN PATENT DOCUMENTS

WO    01/84260 A2    11/2001

OTHER PUBLICATIONS

Pierre Rouanet, et al., "A Comparison of Three Interfaces Using Handheld Devices to Intuitively Drive and Show Objects to a Social Robot: The Impact of Underlying Metaphors", The 18th IEEE International Symposium on Robot and Human Interactive Communication, Sep. 27, 2009, pp. 1066-1072, IEEE, Piscataway, NJ, USA, XP031563628.

(Continued)

*Primary Examiner* — James Trammell
*Assistant Examiner* — Sanjeev Malhotra
(74) *Attorney, Agent, or Firm* — Baker Hostetler LLP

(57) ABSTRACT

A control device for a mobile robot, the robot comprising a camera and a communication unit, comprises a display unit displaying an image corresponding to the image taken by the camera and transmitted by the communication unit, and a user interface, wherein the user interface is configured to allow a user to control a position of a pointer on the image displayed by the display unit, and the user interface comprises a selection unit allowing the user to select a position of the pointer on the image displayed by the display unit, the control device further comprising a computation unit and a communication system, the computation unit being configured to compute displacement commands and send them through the communication system to the robot, said displacement commands being computed to make the robot move to a physical position corresponding to the pointer's position selected by the user on the image.

15 Claims, 5 Drawing Sheets

(52) U.S. Cl.
CPC .............. *G05D1/0246* (2013.01); *G05D 1/028* (2013.01); *G05D 1/0255* (2013.01); *Y10S 901/01* (2013.01); *Y10S 901/47* (2013.01)

(56) References Cited

U.S. PATENT DOCUMENTS

| | | | | |
|---|---|---|---|---|
| 2003/0030399 | A1* | 2/2003 | Jacobs | G05D 1/0274 318/568.16 |
| 2003/0065882 | A1* | 4/2003 | Beeston | G06F 3/0613 711/111 |
| 2005/0259967 | A1* | 11/2005 | Kao | G11B 27/105 386/247 |
| 2006/0250401 | A1* | 11/2006 | Pannese | G06T 13/20 345/474 |
| 2007/0192910 | A1* | 8/2007 | Vu | B25J 5/007 700/245 |
| 2007/0198128 | A1* | 8/2007 | Ziegler | B25J 5/007 700/245 |
| 2007/0199108 | A1* | 8/2007 | Angle | B25J 5/007 318/568.12 |
| 2010/0082156 | A1* | 4/2010 | Root | G05D 1/0038 700/264 |
| 2010/0241289 | A1* | 9/2010 | Sandberg | B25J 9/1689 701/2 |
| 2011/0083089 | A1* | 4/2011 | Pahud | G06F 3/0425 715/765 |
| 2011/0213497 | A1* | 9/2011 | Nair | B25J 9/1666 700/255 |

OTHER PUBLICATIONS

F. Moses, et al., "Evaluating Robot-Operator Job Performance", Retrieved from the Internet: URL:Http://www.dtic.mil/cgi-bin/GetTRDoc?AD=ADA472311&Location=U2&doc=GetTRDoc.pdf, Oct. 10, 2007, pp. ii-B1, XP55008923.

\* cited by examiner

MOBILE ROBOT

CROSS-REFERENCE TO RELATED APPLICATIONS

This application is a National Stage of International patent application PCT/EP11/65322, filed on Sep. 5, 2011, which claims priority to U.S. provisional patent application No. 61/379,777, filed on Sep. 3, 2010, the disclosures of which are incorporated by reference in their entirety.

FIELD OF THE INVENTION

The invention is in the field of mobile robots.

BACKGROUND OF THE INVENTION

Mobile robots are widely known and used in many applications. These mobile robots can for example be used at home, or for professional tasks (defense, security, health, rescue, . . . ).

In general, these mobile robots comprise motors and actuators allowing them to move and act in a physical environment. A control unit controls the robot's motion either with pre-defined commands or with commands sent by a user.

The mobile robots generally comprise a camera and a communication unit, wherein the communication unit transmits an image taken by the camera to a user.

It is highly desirable that the robot be remotely controllable by the user.

A large variety of control devices have been proposed in the past, to allow a user to control the robot and make him move in the physical environment.

It is for example known to remotely control a robot with a control device comprising a display unit displaying the images taken by the robot's camera, and a keyboard, the user controlling the robot's displacements through keys and arrows of the keyboard.

However, the control devices known in the art are tedious and complex to use, especially for long distances and/or for complex trajectories. In addition, only a trained user is able to manage the control of the robot. Therefore, the known solutions to control mobile robots are not satisfactory.

PRESENTATION OF THE INVENTION

According to one aspect of the invention, it is provided a control device for a mobile robot, the robot comprising a camera and a communication unit, the control device comprising a display unit, which displays an image corresponding to the image taken by the camera and transmitted by the communication unit, and a user interface, wherein the user interface is configured to allow a user to control a position of a pointer on the image displayed by the display unit, and the user interface comprises a selection unit allowing the user to select a position of the pointer on the image displayed by the display unit, the control device further comprising a computation unit and a communication system, the computation unit being configured to compute displacement commands and send them through the communication system to the robot, said displacement commands being computed to make the robot move to a physical position corresponding to the pointer's position selected by the user on the image.

According to one embodiment, the pointer is a pattern which aspect depends on the space orientation and/or position of the pointer in the image.

According to one embodiment, the pointer is a pattern which is represented in perspective and parallel to a plane of a physical environment in which the robot is moving.

According to one embodiment, the plane corresponds to a plane of a wall, or a plane of a floor, or a plane of an object located in the physical environment.

According to one embodiment, the size of the pointer depends on the distance between the robot, and the physical position corresponding to the position on which the pointer is located in the image.

There is also provided a system for mobile robot, the system comprising a mobile robot, the robot comprising a camera and a communication unit, and the system further comprising a control device according to any of the previous embodiments.

According to another inventive aspect, there is also provided a method for controlling a mobile robot, the robot comprising a camera and a communication unit, the control device comprising a display unit, which displays an image corresponding to the image taken by the camera and transmitted by the communication unit, a user interface, a computation unit, and a communication system, configured to communicate with the communication unit of the robot, the method comprising the following steps:

a user controls, through the user interface, the position of a pointer on the image displayed by the display unit, the user selects, through a selection unit, a position for the pointer of the image displayed by the display unit, the computation unit computes displacement commands and sends them through the communication system to the robot, said displacement commands being computed to make the robot move to a physical position corresponding to the pointer's position selected by the user on the image.

BRIEF DESCRIPTION OF THE DRAWINGS

The embodiments described in the figures are non-limitative and illustrative embodiments.

DETAILED DESCRIPTION OF PREFERRED EMBODIMENTS

Presentation of a Mobile Robot

Figure 1:
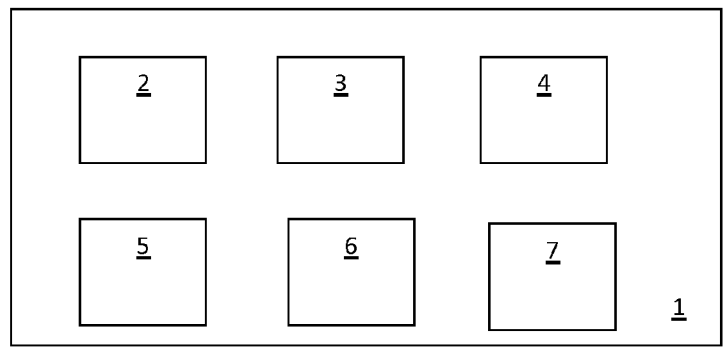
FIG. 1 illustrates components of an embodiment of a mobile robot.

FIG. 1 illustrates an embodiment of a mobile robot 1. For the purpose of the present description, the terms "mobile robot" or "robot" should be considered as synonymous.

The mobile robot 1 comprises motors and actuators 2, allowing him to move in a physical environment, such as a building, a field, or any zone. The actuators comprise for example wheels, or legs, or tracks, or any suitable actuators. In general, the mobile robot 1 can take different positions in the physical environment. If needed, even if the robot 1 does not change its position, parts of the robot 1 may move (rotation, inclination, etc.).

The mobile robot 1 further comprises a camera 3 which takes images from the scene viewed by the mobile robot. If desired, the camera 3 is mobile relatively to the robot 1, in order to shoot various directions of the scene viewed by the robot.

The mobile robot 1 also comprises a communication unit 4, which is able to communicate with a control 9 device.

In general, the communication unit 4 is a wireless communication unit, and uses known communication techniques, such as Wi-Fi, and/or radio communication, and/or Bluetooth, etc. This communication unit 4 allows the robot to send and receive information, such as images, commands, etc.

As known in the art, the mobile robot 1 comprises:
- an energy source 5, which stores the energy required by the robot to perform tasks (for example: a battery);
- a control unit 6, comprising one or more processors, which manage the different functions of the different units of the robot (actuators, camera, etc.).

The control unit 6 may comprise several units, such as a memory to store or record information.

Depending on the needs, the mobile 1 robot may comprise one or more sensors 7, such as position sensor, direction sensor, obstacle sensor, speed and/or acceleration sensor, temperature sensor, attitude sensor, sound sensor, electromagnetic sensor, etc.

Control of the Robot by a User

Figure 2:
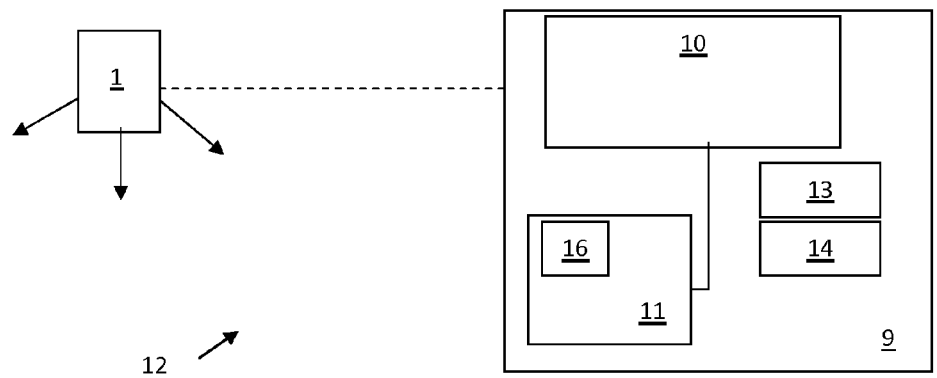
FIG. 2 illustrates an embodiment of a control of a mobile robot by a control device.
Figure 3:
FIG. 3 illustrates an embodiment of a pointer on an image displayed in a control device.
Figure 4:
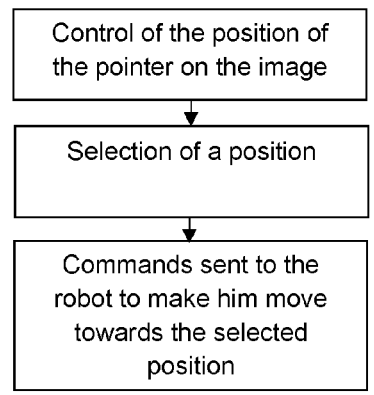
FIG. 4 illustrates an embodiment of a method for controlling a mobile robot.

According to one embodiment, and as shown in FIGS. 2, 3 and 4, the robot 1 is remotely controlled by a user, through a control device 9.

The control device 9 comprises a display unit 10, and a user interface 11.

The control device 9 further comprises a computation unit 13 and a communication system 14.

The computation unit 13 generally comprises at least a processor, at last a memory, and one or programs loaded in this memory. As explained below, the computation unit 13 is configured to control the displacement of the robot 1, by computing displacement commands which are sent to the robot 1.

The communication system 14 allows the control device 9 to communicate with the robot 1. In general, the communication system 14 is a wireless communication unit, and uses known communication techniques, such as Wi-Fi, and/or radio communication, and/or Bluetooth, or any appropriate communication technique.

The display unit 10 is configured to display an image corresponding to the image taken by the camera 3 and transmitted by the robot's communication unit 4 to the control device 9.

A user can thus visualize in real time the scene observed by the robot 1.

The display unit 10 is in general a screen, such as a computer screen, but can for example be a TV screen, a cellular phone screen, or even a projector.

The user interface 11 is configured to allow a user to control a position of a pointer 15 on the image displayed by the display unit 10. A non-limitative example of a pointer 15 is illustrated in FIG. 3. The pointer 15 is in one embodiment a pattern, that the control device 9 makes appear on the image of the scene viewed by the robot 1 and displayed by the display unit 10. The pointer 15 has a form, and/or dimensions, and/or colors which make him apparent and different from the background scene.

The user can thus move the pointer 15 on the image by using the user interface 11. In one non-limitative embodiment, the user interface 11 comprises a mouse, or a joystick, or a tactile interface, or a keyboard, allowing the user to move the pointer 15 on the image.

In addition, the user interface 11 comprises a selection unit 16 allowing the user to select a position of the pointer 15 on the image displayed by the display unit.

This selection unit 16 allows the user to select a position of the pointer on the image displayed by the display unit 10, this position corresponding to a physical position of the physical environment in which the robot 1 is located.

In one non-limitative embodiment, the selection unit 16 comprises a mouse (such as a key of the mouse), or a joystick, or a tactile interface, or a keyboard, allowing the user to select a position of the pointer in the image. For instance, the user double clicks on a position to inform the control device 9 that the desired position of the pointer has been reached (cf. FIG. 3). The selection unit 16 can also include a voice interface, or any selection unit known in the art.

When the user has moved the pointer 15 to a desired position in the image, he thus selects this position through the selection unit 16. This selection indicates that this position corresponds to the desired and targeted position.

The computation unit 13 of the control device 9 is configured to compute displacement commands, which are adapted to make the robot move to a physical position corresponding to the pointer's position selected by the user on the image.

The computation unit 13 thus takes as an input the pointer's position selected by the user on the image, and outputs the displacement commands adapted to reach this position.

The displacement commands are sent through the communication system 14 to the robot 1, which receives them through its own communication unit 4.

In one embodiment, these displacement commands comprise the trajectory that the robot has to take in order to reach the pointer's position. The control unit of the robot then commands the actuators of the robot so that the robot moves along the commanded trajectory.

In another embodiment, these displacement commands directly include the list of commands that are to be sent to the actuators of the robot, in order to reach the pointer's position selected by the user.

The step of computing the displacement commands includes computing a relation between a referential linked to the image taken by the camera, and a referential linked to the robot.

The position of the pointer 15, as selected by the user, is defined in the referential of the image displayed by the display unit, and is then expressed in the robot's referential, this step being performed by the computation unit.

This transformation is a basic mathematic operation which consists in transforming coordinates expressed in one referential to coordinates expressed in another referential. This transformation includes notably rotations and/or translations, expressed in the form of a matrix, as known in the art.

In one embodiment, the pointer is a pattern which aspect depends on the space orientation of the pointer and/or position of the pointer in the image.

In one embodiment, the size of the pointer depends on the distance between the robot (or the camera) and the physical position corresponding to the position on which the pointer is located in the image. For instance, the more the pointer is moved far away from the robot 1 by the user in the image, the more its size is decreased on the image.

In another example, if the pointer 15 is moved towards a wall, or towards the floor, its aspect will change, depending on the orientation of the pointer. This helps the user having a visual feedback on the current position of the pointer 15.

In one embodiment, the pointer 15 is a pattern which is represented in perspective and parallel to a plane of a physical environment in which the robot is moving. For instance, as shown in FIG. 4, the pointer 15 is represented as a circular pattern which is parallel to the floor, as the user has chosen a position of the pointer on the floor. The same principle is applied if the user moves the pointer towards a wall, or any object of the physical environment.

Thus, the plane may correspond for example to a plane of a wall, or a plane of a floor, or a plane of any object located in the physical environment.

The control device 9 offers a simple and efficient control for the user. Even if the robot has to be controlled to move according to complex trajectories, and/or across long distances, the user is provided with an intuitive and user friendly solution to control the displacement of the robot. The user does not have to be a professional or a trained user, but any user, including children, old people, or people who are not familiar with technology, can easily and quickly control the robot.

Control of a Mobile Robot in the Presence of Obstacles in a Physical Environment Another inventive aspect of a robot control will now be described. This aspect may be combined with the aspect, or may be implemented separately.

The mobile robot is here a mobile robot of the type described in the first part of the detailed description ("Presentation of a mobile robot"). The technical features of the mobile robot are thus not repeated.

The technical features which are similar are indicated with a reference number increased by 100.

When a user controls a mobile robot through a control device, displacement commands are sent from the control device to the mobile robot, depending on the user's orders. However, these orders are executed by the robot only if there is no obstacle that can prevent the robot from moving towards the targeted position selected by the user. If there is an obstacle, the displacement command is ignored by the robot. However, from the user's side, it is not always clear why the robot ignores his commands. For the user, this yields to an alteration of the quality and fluidity of the control.

Figure 5:
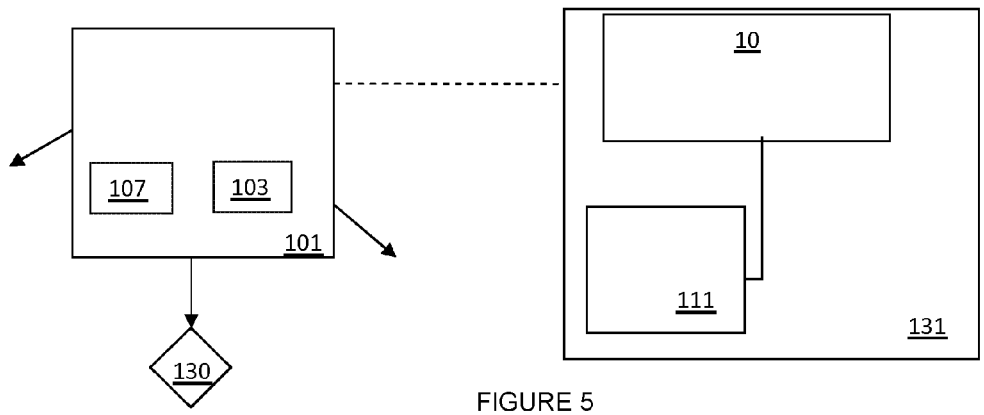
FIG. 5 illustrates an embodiment of a control device of a mobile robot in the presence of obstacles in a physical environment.

As illustrated in FIG. 5, the mobile robot 101 comprises a camera 103 and at least a sensor 107. This sensor is configured to detect obstacles 130. The sensor 107 is for example a sonar, which can be also used by the robot to sense its displacement direction.

In one embodiment, the robot 101 comprises several sensors 107, located all around the robot, in order to detect obstacles 130 in several directions.

The sensor 107 detects in particular obstacles 130 which may block the displacement of the robot 101.

A user can control the displacement of the robot through a control device 131. The control device 131 may be of the type described in the first embodiment (control device 9).

The control device 131 comprises a display unit 110, which displays an image corresponding to the image taken by the camera 103. As described in the first embodiment, the robot and the control device comprise communication units and systems to exchange, in general through a wireless channel, data, images, commands, etc.

The user interface 111 allows a user to control the displacement of the robot. The user interface 111 can be made as described in the first embodiment, or according to any embodiment known in the art.

In one embodiment, the control device 131 is configured to display on the image provided by the display unit 110 an information 133 relative to the detection of the presence of an obstacle 121 by the sensor 107.

A step of displaying on the image provided by the display unit 110 an information 133 relative to the detection of the presence of an obstacle 121 by the sensor 107 is thus achieved.

This information 133 thus warns the user that an obstacle has been detected by the sensor 107 of the robot 101.

Figure 6:
FIG. 6 illustrates an embodiment of information relative to the detection of an obstacle, displayed on a display unit.

In one embodiment, this information is a visual pattern superimposed on the image displayed by the display unit 110. In FIG. 6, the obstacle 130 is a post located in front of the robot 101. The visual pattern may, for example, comprise text and/or images. In this example, the visual pattern is a colored arrow, associated to a warning text. The color is chosen to be immediately visible by the user.

In one embodiment, said information is displayed when the user sends a displacement command to the robot through the control device, and at least part of said displacement is not executed by the robot due to the detection of an obstacle by the robot.

When the robot 101 receives a displacement command from the control device 9 and corresponding to a user order, the robot 101 may ignore this displacement command due to the detection of an obstacle. Thus, when the robot 101 detects an obstacle that prevents him (partially or totally) from executing the displacement required by the user, the control device 9 makes the information appear on the image, in order to warn the user. The user thus understands that his displacement commands have been effectively transmitted to the robot 101 by the control device, but that the fact that the robot ignores his orders is due to the presence of one or more obstacles on the required trajectory.

This control device thus allows an efficient, comfortable, and fluid control for the user.

It can be summarized as a control device (131) for a mobile robot (101), the robot (101) comprising a camera (103) and at least one sensor (107) configured to detect obstacles (121), the control device (131) comprising:
  a display unit (110), which displays an image corresponding to the image taken by the camera (103),
  a user interface (113), which allows a user to control the displacements of the robot,
wherein the control device (131) is configured to display on the image provided by the display unit (110) an information (133) relative to the detection of the presence of an obstacle (121) by the sensor (107).

Preferred but optional features of the control device are the following:
  said information is a visual pattern superimposed on the image displayed by the display unit (110);
  said information is displayed when the user sends a displacement command to the robot, and at least part of said displacement is not executed by the robot due to the detection of an obstacle by the robot.

Other summarized definitions are:
  a system for mobile robot, comprising a mobile robot, the robot comprising a camera, and a communication unit, and a control device as defined above.

a method for controlling a mobile robot (101) with a control device (131), the robot (101) comprising a camera (103), and at least one sensor (107) configured to detect obstacles (121) in a physical environment in which, the control device (131) comprising a display unit (110), which displays an image corresponding to the image taken by the camera (103), a user interface (113), which allows a user to control the displacement of the robot, the method comprising the step consisting of:

displaying on the image provided by the display unit (110) an information (133) relative to the detection of the presence of an obstacle (121) by the sensor (107).

Preferred but optional features of the above method are the following:

said information is a visual pattern superimposed on the image displayed by the display unit (110);

said information is displayed when the user sends a displacement command to the robot, and at least part of said displacement is not executed by the robot due to the detection of an obstacle by the robot.

Device for Connecting a Mobile Robot to a Charging Base

It is described a third inventive aspect for controlling a mobile robot. This embodiment may be combined with one or both the previous aspects, or may be implemented separately.

The mobile robot is here a mobile robot of the type described in the first part of the detailed description ("Presentation of a mobile robot"). The technical features of the mobile robot are thus not repeated.

The technical features which are similar are indicated with a reference number increased by 200.

As previously illustrated in FIG. 1, a mobile robot generally comprises an energy source 5, which stores the energy required by the robot to perform tasks (for example: a battery). As known in the field of mobile robots, the energy source of the robot has to be charged periodically.

In order to charge a mobile robot, it is known in the art to provide a charging base. A charging base is for instance an electric generator.

When the robot detects that its energy source has to be charged, the robot moves towards the charging base.

The connection between the robot and the charging base, in order to charge the robot, can only be performed if the robot is located in a predetermined position with respect to the charging base. This predetermined position allows that electrical connectors, located on the mobile robot and on the charging base, come into contact.

To allow the robot to reach his required position with respect to the charging base, it is known in the art that the mobile robot may sense an infrared signal emitted by the charging base, this infrared signal allowing the mobile robot to position itself with respect to the charging base. A guiding algorithm is used by the robot to deduce its position and orientation based on the infrared signal.

However, this solution requires the robot to reach a precise position with respect to the charging base, which depends on the precision and efficiency of the robot's guiding algorithm. Thus, this solution is not optimal.

Figure 7:
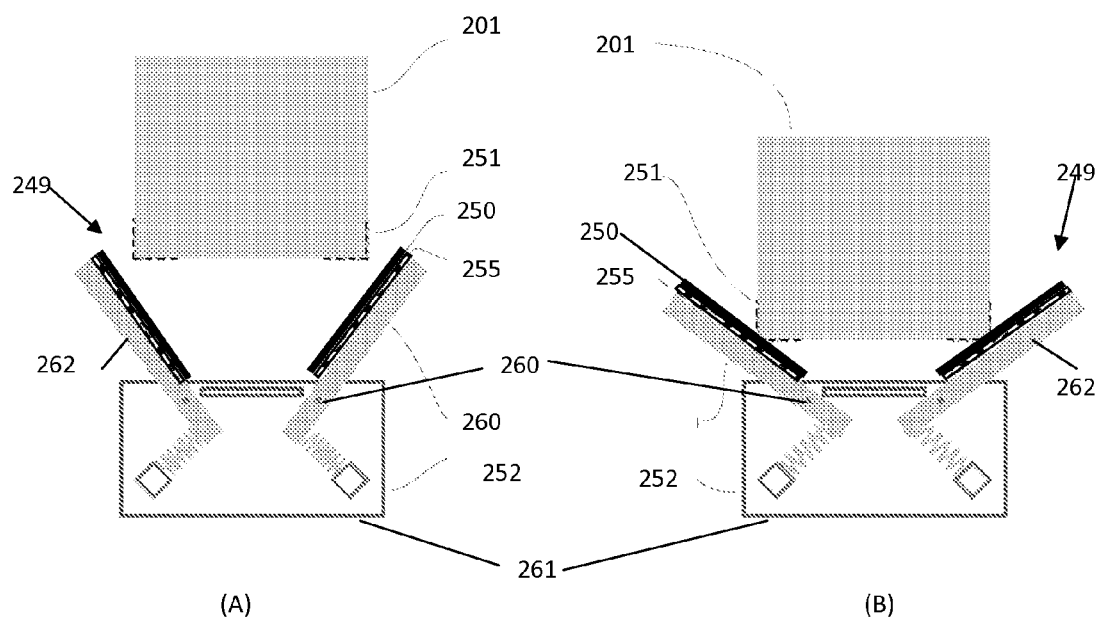
FIG. 7 illustrates an embodiment of a device for connecting a mobile robot to a charging base.

An embodiment of a mobile robot 201 and a charging base 252 is illustrated in FIG. 7. The charging base 252 is, for example, and as known in the art, an electrical generator, which is autonomous or connected to the national grid. The mobile robot 201 and the charging base 252 comprise electrical connectors 250, 251. These electrical connectors 250, 251 are adapted to let an electric current flow. When these electrical connectors are in contact, an electric current can flow from the charging base to the robot, in order to charge the robot, and in particular, its energy source.

The electrical connectors, located on the mobile robot and on the charging base, are configured to come into contact when the mobile robot 201 is located in a predetermined position with respect to the charging base 252.

The electrical connectors of the mobile robot are for instance located at one or more corners of the robot's structure.

FIG. 7 illustrates a device 249 for connecting the mobile robot to the charging base, said device comprising electrical connectors located on the mobile robot and on the charging base.

The electrical connectors of the charging base are mobile according to at least one degree of freedom. In one embodiment, they are mobile relatively to the charging base, and in particular relatively to fixed parts 261 of the charging base.

As illustrated in part (A) of FIG. 7, the mobile robot is first approaching the charging base. When the mobile robot comes closer to the charging base (part (B) of FIG. 7), the electrical connectors of the charging base are moved according to at least one degree of freedom, due to the contact with the mobile robot. The robot thus moves the electrical connectors of the charging base, as its structure comes into contact with said electrical connectors during the approach phase with respect to the charging base.

In one embodiment, mobile parts carrying the electrical connectors are flexible which allows them to rotate when the robot moves closer to the charging base.

In one embodiment, and as illustrated in FIG. 7, the angle between the electrical connectors of the charging base is increased, which provides a larger zone where the robot can be charged. Thus, according to this embodiment, the electrical connectors are adapted to be mobile so that an angle between the electrical connectors is increased.

During their motion, the electrical connectors of the charging base remain on the charging base, but are mobile with respect to fixed parts 261 of the charging base. They are also mobile with respect to the robot.

With the device, the robot does not have to reach a precise charging position with respect to the charging base. An error margin is acceptable, which means that the robot just has to reach a predetermined charging zone.

According to one embodiment, the device further comprises an attraction system 255 configured to provide an attraction so as to move closer at least part of the electrical connectors of the mobile robot and the charging base.

The attraction system provides an attraction so as to move closer at least part of the electrical connectors of the mobile robot and the charging base. The attraction system participates to the achievement of the right position for the mobile robot with respect to the charging base. In particular, the attraction system can attract the electrical connectors of the robot, in order to lead them towards the electrical connectors of the charging base.

When the electrical connectors of the mobile robot and the charging base are in contact, the robot can be charged.

The position of the mobile robot with respect to the charging base does not have to be as precise as in the prior art, and can comprise an error margin.

The charging of the robot is thus eased and improved. The guiding algorithm can also be simplified.

In one embodiment, the electrical connectors are mobile in rotation. For example, the charging base comprises a pivot mechanism 260, around which mobile parts 262, comprising the electrical connectors, are able to rotate.

Thus, when the robot moves closer to the charging base, the robot make the electrical connectors rotate, which thus increases the angle between the electrical connectors of the charging base (cf. FIG. 7). As shown in FIG. 7, the electrical connectors thus surround a larger interior zone in which the robot can enter. As a consequence, the robot does not have to reach a precise charging position with respect to the charging base.

These mobile parts may also be linked to the charging base through a spring. This spring may tend to bring back the mobile parts to their initial position (cf. FIG. 7). The charging base also comprises fixed parts 261, which are not mobile with respect to the charging base.

In one embodiment, the attraction system comprises magnets. These magnets can be for instance located under the electrical connectors of the charging base. Alternatively, these magnets can be located on the mobile robot. The magnets attract the electrical connectors.

This aspect includes a device for connecting a mobile robot and a charging base. It also includes a charging base, and a system comprising a charging base and a mobile robot, wherein the charging base and the mobile robot are cooperating as described previously.

This further inventive aspect can be summarized as a device (249) for connecting a mobile robot (201) to a charging base (252) in order to charge the mobile robot (201), the device (249) comprising:
  electrical connectors (250, 251), located on the mobile robot (201) and on the charging base (252), and configured to come into contact when the mobile robot is located in a predetermined position with respect to the charging base,
  wherein at least part of the electrical connectors of the charging base are mobile according to at least one degree of freedom.

According to one embodiment, the device further comprises an attraction system (255) configured to provide an attraction so as to move closer at least part of the electrical connectors of the mobile robot and the charging base.

According to one embodiment, the electrical connectors are adapted to be mobile so that an angle between the electrical connectors is increased.

Preferred but optional features of this device are the following:
  the attraction system comprises magnets;
  the electrical connectors are mobile in rotation;
  Another summarized definition is a charging base, for charging a mobile robot, comprising:
  electrical connectors configured to come into contact with electrical connectors of the mobile robot, when the mobile robot is located in a predetermined position with respect to the charging base,
  wherein at least part of the electrical connectors are mobile according to at least one degree of freedom.

According to one embodiment, the charging base further comprises an attraction system configured to provide an attraction of the electrical connectors of the mobile robot.

According to one embodiment, the electrical connectors are adapted to be mobile so that an angle between the electrical connectors is increased.

Preferred but optional aspects of the charging base are as follows:
  the attraction system comprises magnets;
  the electrical connectors are mobile in rotation.

Another summary is a system comprising a mobile robot, with electrical connectors, and a charging base as defined above, and cooperating with the mobile robot.

Device for Guiding a Mobile Robot to a Charging Base

It is described a fourth inventive aspect for controlling a mobile robot. This aspect may be combined with one or all the previous aspect, or may be implemented separately.

The mobile robot is here a mobile robot of the type described in the first part of the detailed description ("Presentation of a mobile robot"). The technical features of the mobile robot are thus not repeated.

The technical features which are similar are indicated with a reference number increased by 300.

As already illustrated in FIG. 1, a mobile robot generally comprises an energy source 5, which stores the energy required by the robot to perform tasks (for example: a battery). As known in the field of mobile robots, the energy source of the robot has to be charged periodically.

In some prior art solutions, the mobile robot is charged directly through an electrical socket. The robot comprises an articulated arm which allows the robot to connect with the electrical socket.

However, the majority of prior art solutions rely on the use of a charging base adapted to charge the robot.

The connection between the robot and the charging base, in order to charge the robot, can only be performed if the robot is located in a predetermined position with respect to the charging base. This predetermined position allows the electrical connectors, located on the mobile robot and on the charging base, to come into contact.

Some mobile robots known in the art comprise a camera, which is used to identify an image projected on the ceiling located above the charging base. This image is used as a landmark for the robot to reach a position in which it can be charged by the charging base.

Other prior art attempts include the use of infrared sources on the charging base coupled to infrared sensors on the robot, which allow the robot to reach its targeted position with respect to the charging base.

When the robot is a big size robot (for example, a size larger than 1 meter), the robot has to be guided with a high precision in order to reach the targeted position with respect to the charging base.

However, the prior art solutions cannot provide a satisfactory precision and need to be improved.

Figure 8:
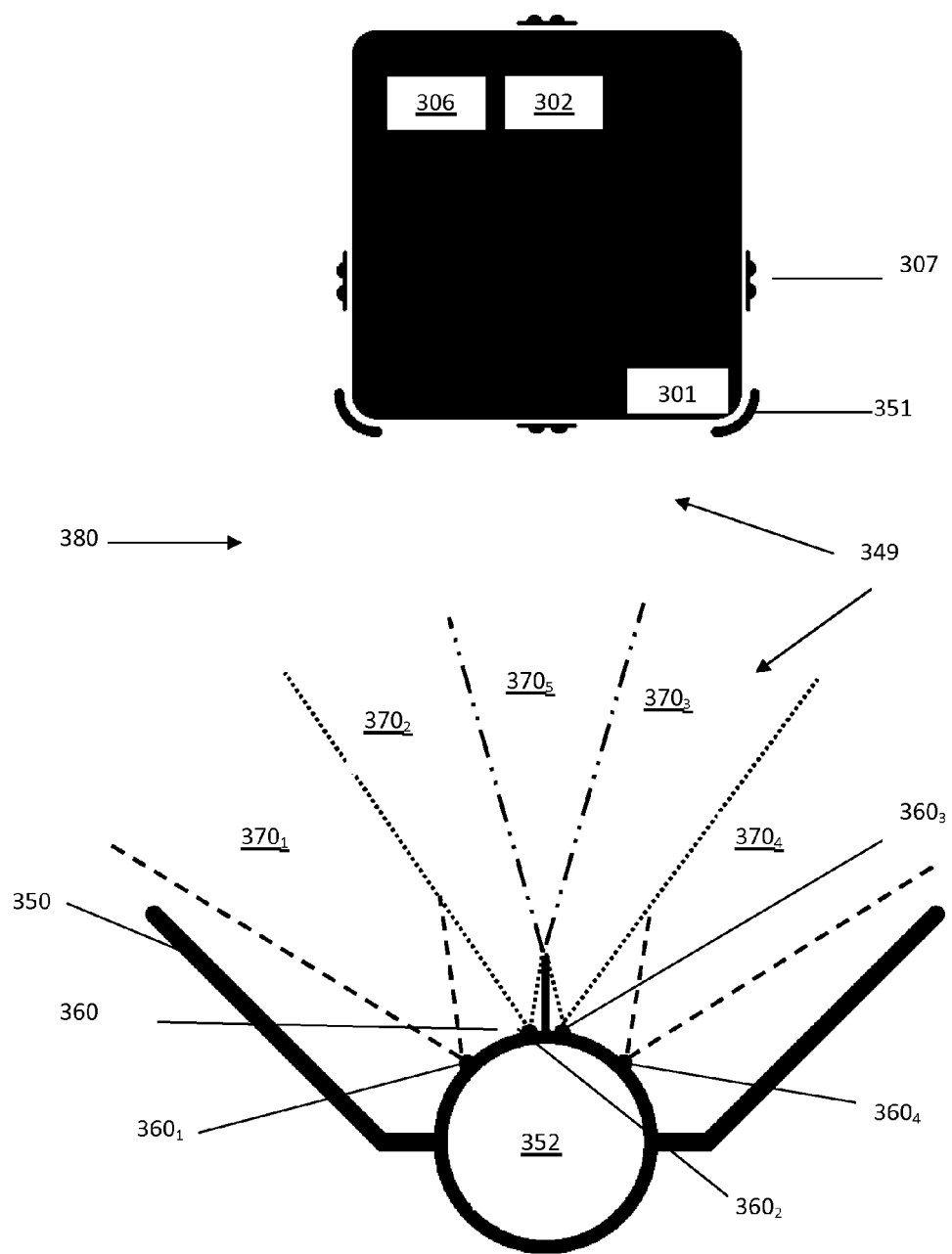
FIG. 8 illustrates an embodiment of a device and system for guiding a mobile robot to a charging base.

A non-limitative embodiment of a mobile robot 301 and a charging base 352 is illustrated in FIG. 8. The charging base 352 is, for example, and as known in the art, an electrical generator, which is autonomous or connected to the national grid.

An embodiment of a device 349 for guiding the mobile robot 301 to the charging base 352 is illustrated.

The device 349 comprises electromagnetic signal sources 360 configured to emit modulated electromagnetic signals which are different for each source.

The electromagnetic signal sources 360 are arranged to allow the signals to be emitted in limited geometric zones ($370_1$, $370_2$, $370_3$, $370_4$, $370_5$) in which the signals partially overlap. The signals do not totally overlap. An embodiment of an arrangement of electromagnetic signal sources 360 is illustrated in FIG. 8.

The device 349 further comprises electromagnetic sensors 307, located on the mobile robot, and configured to sense one or more electromagnetic signals emitted by the electromagnetic signal sources 360, in order to orient the robot 301 with respect to the charging base 352, and guide the robot to the charging base.

Thus, the charging base 352 comprises a plurality of these electromagnetic signal sources 360, for the emission of modulated electromagnetic signals, said signals being intended to be sensed by the robot for his orientation and guidance with respect to the charging base.

The robot 301 uses the sensed electromagnetic signals to reach a position with respect to the charging base, in which the robot is charged by the charging base. The sensed information is used by a control unit 306 of the robot 301, which processes this information in order to deduce the position of the robot 301 with respect to the charging base, and controls actuators 302 of the robot to make him move towards a position in which the robot can be charged by the charging base. This control unit is of the type comprising a processor and if necessary a memory and one or more loaded programs.

The position that the robot has to reach corresponds to a position in which electrical connectors 351 of the robot and electrical connectors 350 of the charging base can come into contact.

Depending on the position of the robot 301 with respect to the charging base, the electromagnetic sensors each sense one modulated electromagnetic signal, or the sum of a plurality of modulated electromagnetic signals.

The electromagnetic signals are generated so that the electromagnetic sensors 307 can identify the electromagnetic sources from which the signals were emitted.

If an electromagnetic sensor senses a modulated electromagnetic signal, it can deduce the electromagnetic signal source which has emitted the signal, since the signals are different from one source to another.

If an electromagnetic sensor senses a sum of a plurality of modulated electromagnetic signals, it indicates that the electromagnetic sensor is located in an intersection zone in which the signals emitted by different electromagnetic sources overlap. The signals are configured to allow the electromagnetic sensors to recognize if they correspond to a sum of different signals, and from which sources they are emitted.

In one embodiment, the modulated electromagnetic signals are modulated binary electromagnetic signals, with different binary values.

For example, the charging base comprises four electromagnetic signal sources 360. In one embodiment, these electromagnetic signal sources are LEDs.

Each source 360 sends a modulated numeric signal, for instance one byte at 1 kHz, said signal being modulated at 38 kHz.

One non-limitative embodiment of modulated electromagnetic signal is described hereafter.

Each byte comprises eight bits, which can be divided as following:
Three bits are used for the identification of the charging base;
Four bits are used for the coding of the electromagnetic signal source;
One bit is used for parity of the signal.

In general, the modulated electromagnetic signals for one charging base are synchronized.

In one embodiment, the electromagnetic signal sources 360 are configured to emit modulated electromagnetic signals which are tuned to allow the electromagnetic sensors 307 to detect the superposition of signals emitted by different electromagnetic signal sources 360.

For example, the following binary values could be used:
Source $360_2$: binary value=0101;
Source $360_3$: binary value=1010.

If an electromagnetic sensor of the robot receives a signal from these two sources, the binary signal will be 1111 (superposition of signals). This means that the electromagnetic sensor is located in a zone in which these signals overlap.

In one embodiment, each electromagnetic sensor 307 is adapted to output at least one of the following state signals:
a state signal indicating the absence of sensed electromagnetic signal;
a state signal indicating the superposition of electromagnetic signals of different electromagnetic signal sources 360;
a state signal indicating a particular electromagnetic signal source 360.

For instance, in the case of the embodiment illustrated in FIG. 8, each electromagnetic sensor 307 is adapted to output the following state signals:
no sensed signal;
state signal indicating "source $360_1$";
state signal indicating "source $360_2$";
state signal indicating "source $360_3$";
state signal indicating "source $360_4$";
state signal indicating "source $360_2$ and source $360_3$" (overlap).

In one embodiment, the charging base 352 comprises an arrangement of electromagnetic signal sources 360 in which:
electromagnetic signal sources (such as sources $360_1$, $360_4$) having a first emission angle are disposed on sides of the charging base, and
electromagnetic signal sources (such as $360_2$, $360_3$) having a second emission angle are disposed in the front of the charging base.

In this arrangement, the first emission angle is greater than the second emission angle.

The use of a larger emission angle for the electromagnetic signal sources disposed on sides of the charging base is useful to delimit the sides of the charging base.

The use of a smaller emission angle for the electromagnetic signal sources disposed in front of the charging base is useful to delimit with precision the arrival zone for the robot, this arrival zone comprising the charging position that the robot has to reach in order to be charge by the charging base. The front site corresponds to the side where the robot has to come into contact with the charging base in order to be charged.

The system 380 comprising the charging base and the mobile robot is a system which provides a mobile robot which is guided to its charging base with precision and efficiency. It is particularly useful for big size robots, which require the robots to reach a precise position with respect to the charging base.

Figure 9:
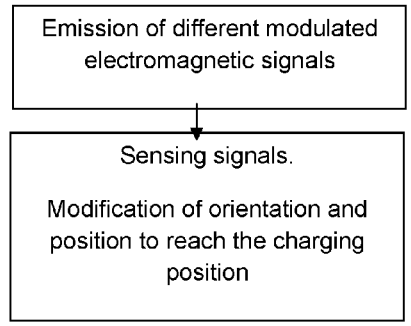
FIGS. 9 and 10 are embodiments of methods for guiding a mobile robot with respect to the charging base.
Figure 10:
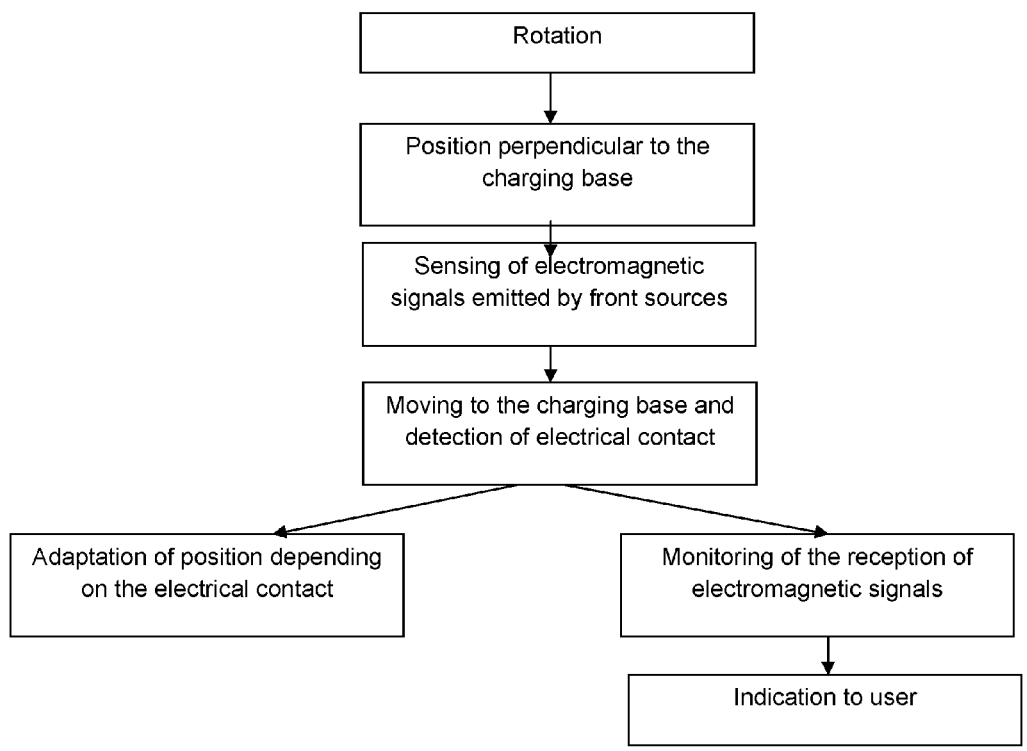

In FIGS. 9 and 10, embodiments of methods for guiding a mobile robot with respect to the charging base are illustrated.

In one embodiment, the charging base 352 comprises electromagnetic signal sources 360 which are emitting modulated electromagnetic signals, said signals being different for each source, said signals being emitted in limited geometric zones ($370_1$, $370_2$, $370_3$, $370_4$, $370_5$) in which they partially overlap.

The robot 301 comprises electromagnetic sensors 307 which are sensing one or more electromagnetic signals emitted by the electromagnetic signal sources 360, the robot using the sensed electromagnetic signals to reach a position with respect to the charging base, in which the robot is charged by the charging base.

In one embodiment, electromagnetic signal sources 360 are emitting modulated electromagnetic signals, and the electromagnetic sensors 307 are detecting the electromagnetic signal source from which the signal is emitted, and/or the electromagnetic signal sources 360 are detecting the superposition of signals emitted by different electromagnetic signal sources 360.

In one embodiment, the robot first makes a rotation around itself, and deduces from the sensed electromagnetic signals its relative position with respect to the charging base.

In one embodiment, the robot first moves in order to be perpendicular to the charging base.

Then, the robot moves closer to the charging base until its electromagnetic sensors 307 sense one or more electromagnetic modulated signals emitted by electromagnetic signal sources ($360_1$, $360_4$) arranged in the front of the charging base. This indicates that the robot is moving in the right path.

If necessary, the robot rotates in order to direct its side comprising the electrical connectors 351 towards the charging base. In one embodiment, the electrical connectors 351 of the robot are located at the backside of the robot. Thus, the robot needs to have its backside oriented towards the charging base. In FIG. 8, the backside of the robot is oriented towards the charging base, and the front side of the robot is oriented opposite the charging base. In FIG. 8, the right electrical connector of the robot is connected to the ground of the battery, and the left electrical connector is connected to the positive terminal of the battery. Similarly, the right electrical connector of the charging base is connected to the ground, and the left electrical connector is connected to the positive terminal.

Then, the robot moves towards the charging base until it detects an electrical contact with the charging base. Depending on the position of the electrical connectors and the orientation of the robot, this movement can be a backward movement with respect to the robot's orientation.

The electrical contact corresponds to an electrical contact between the electrical connectors of the robot and the electrical connectors of the charging base.

When the electrical contact is detected, the robot is being charged by the charging base.

During charging, monitoring steps are performed.

In one embodiment, the robot monitors an electrical contact with the charging base, and adapts its position if said electrical contact is cut. This adaptation of position is in general done through low amplitude movements.

In one embodiment, if the robot detects that its electromagnetic sensors have not sensed any electromagnetic modulated signals emitted by electromagnetic signal sources during a predetermined period of time, the robot provides an indication for a user. This indication is for example an alarm.

This can mean that the charging base has been shut off, for example due to an electrical cut-out. The user is thus informed of the situation by the robot.

This further inventive aspect can be summarized as a device (349) for guiding a mobile robot (301) to a charging base (352) in order to charge the mobile robot (301), the device (349) comprising:
  electromagnetic signal sources (360), located on the charging base, and configured to emit modulated electromagnetic signals which are different for each source, the electromagnetic signal sources (360) being arranged to allow the signals to be emitted in limited geometric zones ($370_1$, $370_2$, $370_3$, $370_4$) in which they partially overlap,
  electromagnetic sensors (307), located on the mobile robot, and configured to sense one or more electromagnetic signals emitted by the electromagnetic signal sources (360), in order to guide the robot (301) to the charging base (352).

Preferred but optional aspects of the device are as follows:
  the modulated electromagnetic signals are generated so that the electromagnetic sensors (307) can identify the electromagnetic sources from which the signals were emitted;
  the modulated electromagnetic signals are modulated binary electromagnetic signals, with different binary values;
  the electromagnetic signal sources (360) are configured to emit modulated electromagnetic signals which are tuned to allow the electromagnetic sensors (307) to detect the superposition of signals emitted by different electromagnetic signal sources (360);
  each electromagnetic sensor (307) is adapted to output at least one of the following state signals:
    a state signal indicating the absence of sensed electromagnetic signal,
    a state signal indicating the superposition of electromagnetic signals of different electromagnetic signal sources (360),
    a state signal indicating a particular electromagnetic signal source (360).

Another summary is a charging base, configured to cooperate with a mobile robot (301) in order to charge said mobile robot, the charging base comprising:
  electromagnetic signal sources (360) configured to emit modulated electromagnetic signals which are different for each source, the electromagnetic signal sources (360) being arranged to allow the signals to be emitted in limited geometric zones ($370_1$, $370_2$, $370_3$, $370_4$) in which they partially overlap, said signals being intended to be sensed by the robot in order to guide the robot (301) to the charging base (352).

Preferred but optional aspects of the charging base are as follows:
  the modulated electromagnetic signals are generated so that electromagnetic sensors (307) can identify the electromagnetic sources from which the signals were emitted;
  the modulated electromagnetic signals are modulated binary electromagnetic signals, with different binary values;
  electromagnetic signal sources (360) are configured to emit modulated electromagnetic signals which are tuned to allow the electromagnetic sensors (307) to detect the superposition of signals emitted by different electromagnetic signal sources (360);
  the charging base comprises an arrangement of electromagnetic signal sources (360) in which:
  electromagnetic signal sources ($360_1$, $360_4$) having a first emission angle are disposed on sides of the charging base,
  electromagnetic signal sources ($360_2$, $360_3$) having a second emission angle are disposed in the front of the charging base, the first emission angle being greater than the second emission angle.

Yet other summaries are:
a system (380) comprising:
a mobile robot (301), comprising electromagnetic sensors (307) located on the mobile robot, and
a charging base (352) according to any of claims 6 to 10, wherein the electromagnetic sensors (307) are configured to sense one or more electromagnetic signals emitted by the electromagnetic signal sources (360) of the charging base (352), in order to guide the robot (301) to the charging base (352);
a method for guiding a mobile robot with respect to a charging base, in order to charge the mobile robot, wherein:

the charging base (352) comprises electromagnetic signal sources (360) which are emitting modulated electromagnetic signals, said signals being different for each source, said signals being emitted in limited geometric zones ($370_1$, $370_2$, $370_3$, $370_4$) in which they partially overlap, and the robot (301) comprises electromagnetic sensors (307) which are sensing one or more electromagnetic signals emitted by the electromagnetic signal sources (360), the robot using the sensed electromagnetic signals to reach a position with respect to the charging base, in which the robot is charged by the charging base.

Preferred but optional aspects of the above method are as follows:

the methods comprises a step in which the robot makes a rotation around itself, and deduces from the sensed electromagnetic signals its relative position with respect to the charging base;

electromagnetic signal sources (360) are emitting modulated electromagnetic signals, and the electromagnetic sensors (307) are detecting the electromagnetic signal source from which the signal is emitted, and/or the electromagnetic signal sources (360) are detecting the superposition of signals emitted by different electromagnetic signal sources (360).

the method comprises steps in which:

the robot moves in order to be perpendicular to the charging base, the robot moves closer to the charging base until its electromagnetic sensors (307) sense one or more electromagnetic modulated signals emitted by electromagnetic signal sources ($360_1$, $360_4$) arranged in the front of the charging base, and the robot moves towards the charging base until it detects an electrical contact with the charging base;

the robot monitors an electrical contact between the robot and the charging base, and adapts its position if said electrical contact is cut;

if the robot detects that its electromagnetic sensors have not sensed any modulated electromagnetic signals emitted by the electromagnetic signal sources during a predetermined period of time, the robot provides an indication to the user.

Combination of the Embodiments

All the four inventive aspect which have been described can be combined.

Alternatively, only some of these embodiments can combined.

Alternatively, each embodiment can be implemented separately.

The invention applies to all mobile robots, which are remotely controlled and adapted to move in space, and in particular to security robots, home robots, and/or outdoor robots.

The invention claimed is:

1. A control device for a robot including a camera and a communication unit, the control device comprising:
a display unit that displays an image corresponding to an image taken by the camera and transmitted by the communication unit;
a user interface including:
at least one of a mouse and a tactile interface, and
a selection unit that receives a selected position of a pointer, the selected position being a position of the pointer within the image displayed by the display unit;
a computation unit that computes displacement commands based on the selected position of the pointer; and
a communication system,
wherein the user interface is configured to control a movement of the pointer on the image displayed by the display unit according to an operation of the at least one of the mouse and the tactile interface,
wherein the computation unit sends the displacement commands to the robot through the communication system,
wherein the displacement commands include a trajectory of movement required to move the robot to a physical position corresponding to the selected position received by the selection unit, and
wherein the control device controls actuators of the robot based on the displacement commands to move the robot along the trajectory of movement to the physical position.

2. The control device according to claim 1, wherein the pointer is a pattern, and
wherein an aspect of the pointer depends on a space orientation and/or position of the pointer in the image.

3. The control device according to claim 1, wherein the pointer is a pattern represented in perspective and parallel to a plane of a physical environment in which the robot is moving.

4. The control device according to claim 3, wherein the plane corresponds to a plane of a wall, or a plane of a floor, or a plane of an object located in the physical environment.

5. The control device according to claim 1, wherein a size of the pointer in the image on the display unit changes in correspondence to a distance between the robot and the physical position corresponding to the selected position received by the selection unit.

6. The control device according to claim 1, wherein the control device is configured to display information on the image displayed on the display unit that indicates an obstacle has been detected in response to at least one sensor of the robot detecting the obstacle.

7. The control device according to claim 6, wherein the control device is configured to stop at least a portion of an execution of the displacement commands to move the robot to the physical position in response to the at least one sensor of the robot detecting the obstacle.

8. A system comprising:
a control device according to claim 1, and
a robot including a camera and a communication unit, the robot being controlled by the control device.

9. A method of controlling a robot including a camera, a communication unit, and a control device, the control device including a display unit, a user interface, a computation unit, and a communication system, the user interface including a selection unit and at least one of a mouse and a tactile interface, the method of controlling the robot comprising:
operating the at least one of the mouse and the tactile interface to control a movement of a pointer on an image displayed by the display unit corresponding to an image taken by the camera and transmitted by the communication unit; and
selecting a selected position for the pointer on the image displayed by the display unit with the selection unit of the user interface,
wherein the computation unit computes displacement commands based on the selected position and sends the displacement commands to the robot through the communication system,
wherein the control device controls actuators of the robot based on the displacement commands to move the robot along a trajectory of movement required to move the robot to a physical position corresponding to the selected position, and wherein the displacement commands include the trajectory of movement.

10. The method according to claim 9, wherein the pointer is a pattern, and
an aspect of the pointer depends on a space orientation and/or position of the pointer in the image.

11. The method according to claim 9, wherein the pointer is a pattern represented in perspective and parallel to a plane of a physical environment in which the robot is moving.

12. The method according to claim 11, wherein the plane corresponds to a plane of a wall, or a plane of a floor, or a plane of an object located in the physical environment.

13. The method according to claim 9, wherein a size of the pointer in the image displayed on the display changes in correspondence to a distance between the robot and the physical position corresponding to the selected position.

14. The method according to claim 9, further comprising:
detecting an obstacle with at least one sensor of the robot; and
displaying information on the image displayed on the display unit indicating a presence of the obstacle.

15. The method according to claim 14, further comprising stopping at least a portion of an execution of the displacement commands by the controlling the actuators to move the robot in response to the detecting the obstacle with the at least one sensor.

* * * * *